(12) United States Patent
Yu et al.

(10) Patent No.: US 8,655,039 B2
(45) Date of Patent: Feb. 18, 2014

(54) METHOD OF SEGMENTING LESIONS IN IMAGES

(75) Inventors: Dong Hoon Yu, Daejeon (KR); Soo Yeul Lee, Daejeon (KR); Jeong Won Lee, Daejeon (KR); Seung Hwan Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 165 days.

(21) Appl. No.: 13/285,231

(22) Filed: Oct. 31, 2011

(65) Prior Publication Data

US 2012/0128224 A1 May 24, 2012

(30) Foreign Application Priority Data

Nov. 22, 2010 (KR) ........................ 10-2010-0116311

(51) Int. Cl.
*G06K 9/00* (2006.01)
*A61B 5/05* (2006.01)
(52) U.S. Cl.
USPC ............................ 382/131; 382/274; 600/410
(58) Field of Classification Search
USPC ......... 382/100, 103, 128–134, 162, 168, 173, 382/181, 199, 232, 254, 274–276, 291, 382/305; 600/443, 410; 250/208.1
See application file for complete search history.

(56) References Cited

U.S. PATENT DOCUMENTS

| | | | |
|---|---|---|---|
| 5,984,870 A | 11/1999 | Giger et al. | |
| 6,855,114 B2 | 2/2005 | Drukker et al. | |
| 7,187,800 B2 * | 3/2007 | Hibbard | 382/173 |
| 7,430,320 B2 | 9/2008 | Lee et al. | |
| 7,466,848 B2 * | 12/2008 | Metaxas et al. | 382/128 |
| 8,299,413 B2 * | 10/2012 | Vogt et al. | 250/208.1 |
| 2005/0027188 A1 * | 2/2005 | Metaxas et al. | 600/410 |
| 2005/0283076 A1 * | 12/2005 | Hangiandreou et al. | 600/443 |

FOREIGN PATENT DOCUMENTS

KR  1020030070324 A  8/2003

OTHER PUBLICATIONS

Karla Horsch et al., "Automatic segmentation of breast lesions on ultrasound", Med. Phys., Aug. 2001, pp. 1652-1659, vol. 28, No. 8, Am. Assoc. Phys. Med.
Anant Madabhushi et al., "Combining Low-, High-Level and Empirical Domain Knowledge for Automated Segmentation of Ultrasonic Breast Lesions", Feb. 2003, pp. 155-169, vol. 22, No. 2, IEEE.
Allaa R. Hilal et al., "Uniform Illumination Constraint Enhancement and Utility Weighted Voting Fusion for Ultrasonic Breast Lesion Segmentation", 2009, pp. 1-4, IEEE.

* cited by examiner

*Primary Examiner* — Seyed Azarian

(57) ABSTRACT

The method of segmenting a lesion in an image according to the present invention includes the steps of: obtaining an image of a region of interest from an image of a lesion; adjusting the contrast of the obtained image of the region of interest such that the contrast changes according to the distance from the center of the region of interest; removing noise from the image whose contrast is adjusted; and separating the region of the lesion from the noise-removed image. In the step of adjusting the contrast, the image is adjusted such that the contrast is increased as it goes away from the center of the region of interest, and thus it is possible to segment the lesion while maintaining the original shape of the lesion, thereby reliably segmenting the lesion even in the case where the inside of the lesion is not uniform.

10 Claims, 5 Drawing Sheets

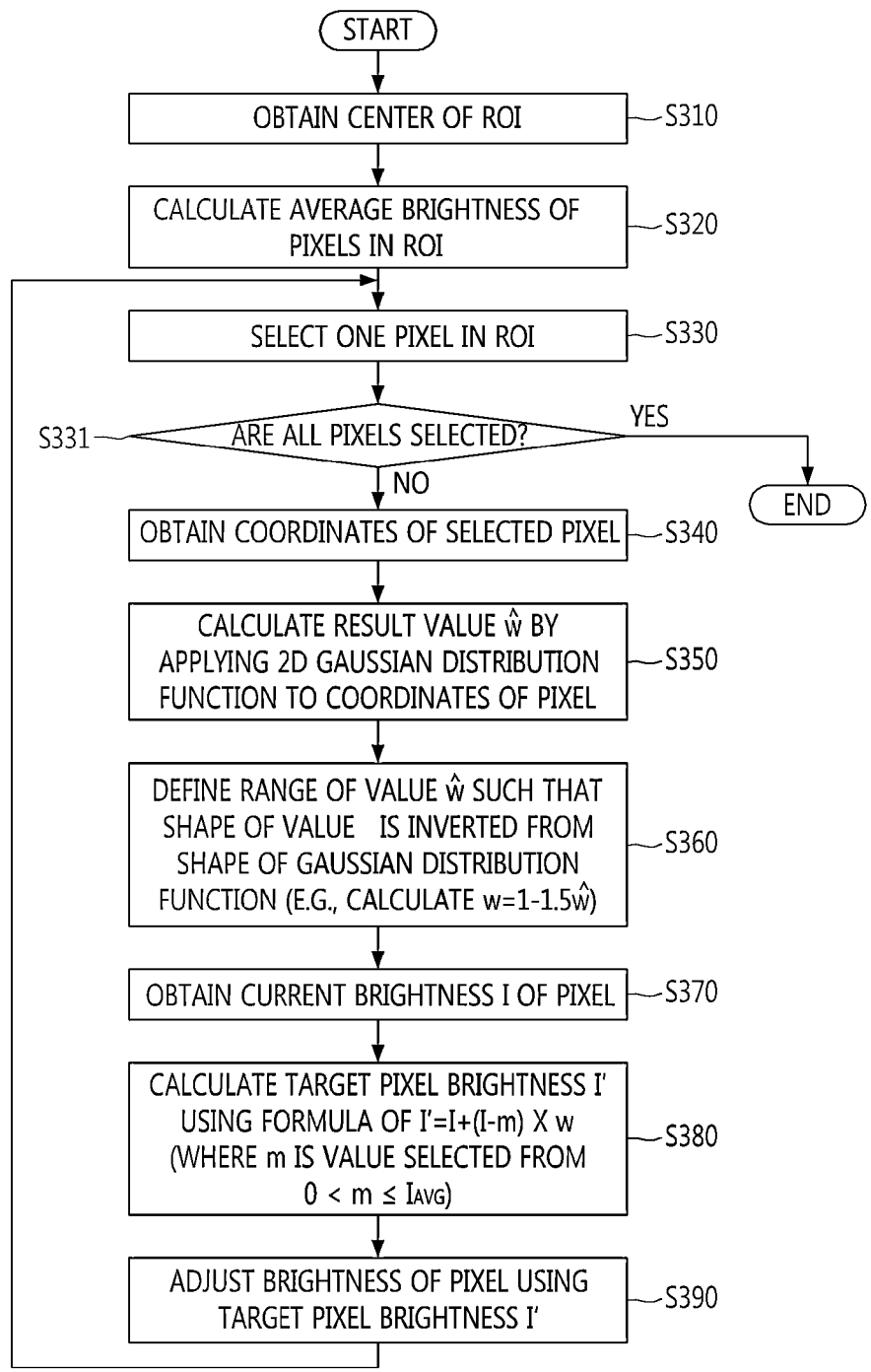

400

METHOD OF SEGMENTING LESIONS IN IMAGES

CROSS-REFERENCE TO RELATED PATENT APPLICATION

This application claims the benefit of Korean Patent Application No. 10-2010-0116311, filed on Nov. 22, 2010, in the Korean Intellectual Property Office, the disclosure of which is incorporated herein in its entirety by reference.

BACKGROUND OF THE INVENTION

1. Field of the Invention

The present invention relates to a method of segmenting a lesion in an image and, more particularly, to a method which can automatically detect a boundary of a lesion in an ultrasound image of a breast.

2. Description of the Related Art

Due to changes in dietary life and decrease in breast feeding, the incidence of female breast cancer has increased over previous years. Especially, the breast cancer has recently become a very important part of many female cancers as the incidence rate of breast cancer has ranked the first among all of the female cancers and the mortality rate has ranked the second in the world.

When a primary tumor having a size of 5 mm to 2 cm is found, the cure rate increases, and thus the early diagnosis of breast cancer is very important. Once a small tumor is found in the breast, it is determined whether the tumor is benign or malignant by periodically observing the shape of the growing tumor, and then it is determined whether to perform surgery.

Diagnostic imaging technologies, in which electronic engineering, computer engineering, physics, medicine, physiology, etc. are combined, have been led by the developed countries with advanced industrial technologies, extensive experience in management of high technologies, and a market from which enormous research and development costs can be recovered.

At present, the diagnosis of breast cancer is made mainly by breast X-ray imaging or two-dimensional breast ultrasound. The X-ray imaging has advantages such as high resolution, low noise, and easy detection of calcification which often occurs in a tumor. However, the lesion and the breast tissue where the lesion is located are all shown as white, and thus it is difficult to accurately identify the position of the lesion and, in the case of women with dense breast tissue, this identification is more difficult.

In addition to the above-described problems, there is a serious problem such as radiation exposure. Even with a small amount of radioactivity, the radioactivity may be another cause of breast cancer and the risk is greater in the case of lactating women. For these reasons, the early diagnosis of breast cancer using the X-ray imaging is not easy to perform.

In the case of ultrasonic images, the calcification is hardly found, but the breast tissue is shown as white and the lesion is shown as dark. Thus, it is easier to find the lesion. Most of all, the screening for breast cancer can be easily achieved even in the case of dense breast tissue. Moreover, the fact that the ultrasonic is harmless to humans increases the possibility of early diagnosis and allows patients to undergo medical examinations for suspicious spots more frequently, thereby increasing the accuracy of the diagnosis.

For an accurate diagnosis of cancer, it is necessary to observe the change in shape and size of a lesion at a predetermined interval of time and, to this end, it is necessary to constantly detect the boundary of the lesion. However, when a doctor draws the boundary directly by hand, it is difficult to quantitatively express the change in shape, size, etc.

In order to automatically segment the lesion, there is a method of segmenting a lesion using a threshold value based on the idea that the inside of a lesion is dark and the outside thereof is light. Since an ultrasonic image has much noise due to its nature, filtering is used to remove noise from the image, and then the threshold value is applied to the image. However, in the case where the inside of the lesion is not uniformly dark, it is difficult to determine an appropriate threshold value even after the filtering, and thus a satisfactory result may not be achieved.

Moreover, a method of multiplying an image by a Gaussian shape is used to prevent the case where the shape of a lesion is not defined within a region of interest due to several factors such as noise. However, according to this method, the Gaussian shape has a great influence on the shape of the lesion, and thus the lesion may lose its original shape.

SUMMARY OF THE INVENTION

The present invention has been made in an effort to solve the above-described problems associated with prior art, and an object of the present invention is to provide a method of segmenting a lesion in an image, which can reliably detect a boundary of a breast lesion even in the case where the inside of the lesion is not uniform.

According to an aspect of the present invention to achieve the above object of the present invention, there is provided a method of segmenting a lesion implemented by an apparatus of segmenting a lesion, the method comprising the steps of: obtaining an image of a region of interest from an image of a lesion; adjusting the contrast of the obtained image of the region of interest such that the contrast changes according to the distance from the center of the region of interest; removing noise from the image whose contrast is adjusted; and separating the region of the lesion from the noise-removed image.

The image may be an image of a breast selected from the group consisting of an ultrasonic image, a digital image taken by digital mammography, an analog image taken by analog mammography and digitally converted, and an MRI image.

In the step of adjusting the contrast, the image may be adjusted such that the contrast is increased as it goes away from the center of the region of interest.

The step of adjusting the contrast may comprise the steps of: obtaining the center (x0, y0) of the region of interest; calculating an average brightness $I_{avg}$ of the current brightness I of pixels in the region of interest; and adjusting the brightness of each pixel such that the contrast is increased as it goes away from the center of the region of interest, wherein the step of adjusting the brightness may comprise the steps of: obtaining coordinates (x, y) of a pixel; calculating a result value $\hat{w}$ by applying a two-dimensional Gaussian distribution function to the obtained coordinates (x, y) of the pixel; calculating a value w by defining the range of the value $\hat{w}$ such that the shape of the calculated value $\hat{w}$ is inverted from the shape of the original two-dimensional Gaussian distribution function; obtaining the current brightness I of the pixel; calculating a target pixel brightness I' using the obtained current brightness I and the calculated value w to adjust the contrast; and adjusting the brightness of the pixel to the target pixel brightness I'.

In the step of calculating the value w, the value $\hat{w}$ may be substituted into $w = 1 - 1.5 \cdot \hat{w}$ such that the calculated value w has a range of $-0.5 \leq w < 1$.

In the step of calculating the target pixel brightness I', the obtained current brightness I and the calculated value w may be substituted into I'=I+(I−m)×w to calculate the target pixel brightness I' and, wherein m may be a value selected from the range of $0 < m \leq I_{avg}$.

The step of removing the noise may comprise the step of performing morphological filtering on the image whose contrast is adjusted.

The step of removing the noise may comprise the step of performing Gaussian low-pass filtering on the morphologically filtered image.

The step of separating the region may comprise the steps of: dividing the region of the lesion from the noise-removed image; and obtaining a boundary of the lesion from the image from which the region of the lesion is divided.

The step of dividing the region may comprise the steps of: calculating a threshold value for the obtained image of the region of interest; and applying the calculated threshold value to the noise-removed image, thereby dividing the region of the lesion.

The step of dividing the region may further comprise the step of eliminating small regions other than the region of the lesion from the image from which the region of the lesion is divided.

BRIEF DESCRIPTION OF THE DRAWINGS

The above and other features and advantages of the present invention will become more apparent by describing in detail exemplary embodiments thereof with reference to the attached drawings in which:

FIG. 3 is a sequence chart showing steps of a radius-dependant contrast adjustment (RDCA) step in detail in accordance with an exemplary embodiment of the present invention.

DETAILED DESCRIPTION OF THE INVENTION

Figure 1:
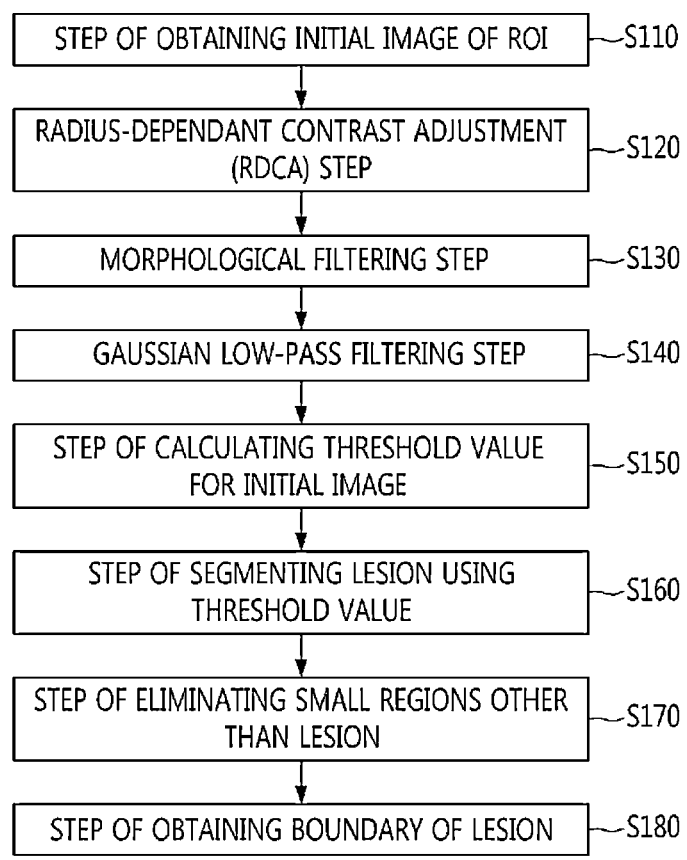
FIG. 1 is a sequence chart showing steps of a method of segmenting a lesion in accordance with an exemplary embodiment of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, A, B etc. may be used herein to describe various elements, these elements should not be limited by these terms. These terms are only used to distinguish one element from another. For example, a first element could be termed a second element, and similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in detail with reference to the accompanying drawings. Like reference numerals in the drawings denote like elements, and thus repeated descriptions will be omitted.

The present invention employs a method of adjusting the contrast ratio with respect to an initial region of interest to segment a lesion. The contrast ratio means a difference between a light value and a dark value of gray scale values and is also called "contrast". When an image is generally light or dark, the image is considered as a low contrast image.

On the contrary, when an image in which a specific area is light and other areas are dark, the difference between two areas is readily recognized, and the image is referred to as a high contrast image. In general, a higher contrast image gives a clearer impression to the eye. To increase the contrast ratio, it is necessary to make the light pixels lighter and the dark pixels darker.

While the criteria for distinguishing between light and dark levels may be defined in various ways, the value of 128, an intermediate gray scale value, is typically used. When the value of 128 is used as a criterion, it is possible to achieve a code for increasing the contrast ratio by making the pixels having a value greater than 128 lighter and the pixels having a value smaller than 128 darker. The above-described method may be performed in the opposite manner to reduce the contrast ratio.

Therefore, the present invention discloses a method of adjusting the contrast ratio between the inside and outside of a lesion to be different from each other so as to clearly distinguish the lesion from the outside of the lesion. In order to reduce the contrast of the inside of the lesion and to increase the contrast of the outside of the lesion, the present invention discloses a method of inverting the shape of a Gaussian function and appropriately adjusting the contrast ratio such that the shape of the lesion can be more clearly seen.

The method of segmenting the lesion according to the present invention may be implemented as a program code to be executed in a computer device or may be implemented as a firmware and mounted in a mechanical device for segmenting a lesion. The types of devices for detecting the lesion are not limited.

The image used in the present invention is not limited to an ultrasonic image but may include a digital image taken by digital mammography, an analog image taken by analog mammography and digitally converted, an MRI image, etc.

Next, regarding the method of segmenting the lesion according to the present invention, a step of segmenting a breast lesion in an ultrasonic image in accordance with an exemplary embodiment of the present invention will be described, and then a radius-dependant contrast adjustment (RDCA) step in accordance with an exemplary embodiment of the present invention will be described in more detail.

Method of Segmenting Lesion in Ultrasonic Image

In an exemplary embodiment of the present invention, a method of segmenting a lesion in an ultrasonic image of a breast implemented in an apparatus for segmenting a lesion will be described with reference to images shown in the accompanying drawings.

Figure 2A:
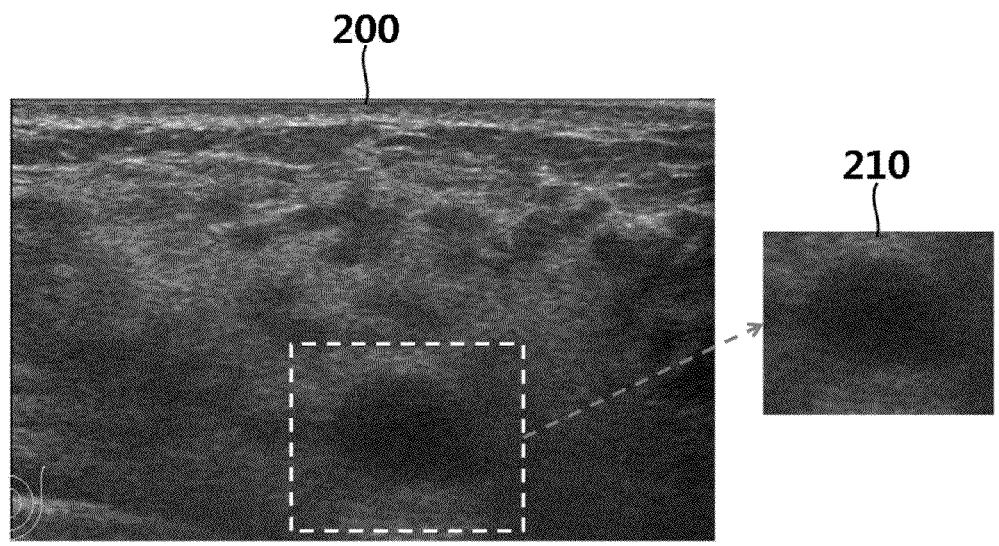
FIG. 2A is a conceptual diagram showing an example in which only a region of interest (ROI) is separated from an entire image.
Figure 2B:
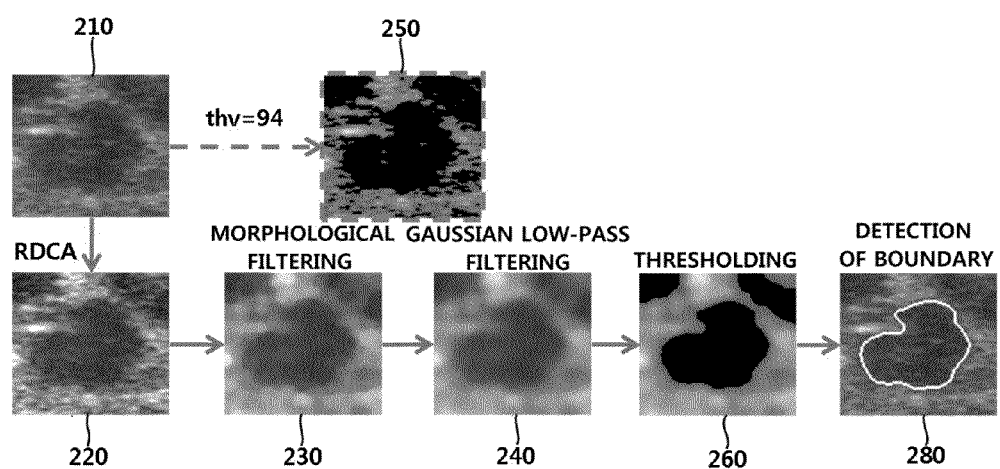
FIG. 2B is a conceptual diagram showing an image of each step of a method of segmenting a lesion in accordance with an exemplary embodiment of the present invention.

FIG. 1 is a sequence chart showing steps of a method of segmenting a lesion in accordance with an exemplary embodiment of the present invention, FIG. 2A is a conceptual diagram showing an example in which only a region of interest (ROI) is separated from an entire image, and FIG. 2B is a conceptual diagram showing an image of each step of a method of segmenting a lesion in accordance with an exemplary embodiment of the present invention.

Referring to FIG. 1, a method of segmenting a lesion in accordance with an exemplary embodiment of the present invention comprises a step (S110) of obtaining an initial image of a region of interest (ROI), a radius-dependant contrast adjustment (RDCA) step (S120), a morphological filtering step (S130), a Gaussian low-pass filtering step (S140), a step (S150) of calculating a threshold value for an initial image, a step (S160) of segmenting a lesion using the threshold value, a step (S170) of eliminating small regions other than the region of a lesion from an image, and a step (S180) of obtaining a boundary of a lesion.

First, in the step of obtaining the initial image of the region of interest (ROI), a region corresponding to a lesion is selected from an ultrasonic image of a breast to obtain an input image for segmenting the lesion. Referring to FIG. 2A, it can be seen that the position and size of a lesion is set to a rectangular shape and only an image 210 for the corresponding region is obtained as an input image.

While the present embodiment shows a method of obtaining the corresponding image by manually setting the ROI, the method of setting the ROI according to the present invention is not limited thereto, and any known method of automatically setting the ROI may be used.

In the radius-dependant contrast adjustment (RDCA) step (S120), the center of the obtained image of the ROI is obtained, and the contrast ratio is adjusted in proportion to the distance from the center.

The RDCA step (S120) of the present invention facilitates the segmentation of lesions, even in the case where the inside of the lesion is not uniform, by adjusting the image such that the contrast of the inside of the lesion is reduced and the contrast is increased as it goes away from the lesion. That is, after obtaining the center of the image 210 of the initial ROI, the image of the lesion is adjusted such that the shape of the lesion stands out by reducing the contrast of pixels near the center and increasing the contrast of pixels away from the center.

Referring to FIG. 2B, an RDCA image 220 obtained by adjusting the contrast of the initial ROI image 210 in proportion to the radius is shown. Referring to the RDCA image 220, it can be seen that the inside of the lesion becomes more uniform and thus is more clearly distinguished from the outside of the lesion while maintaining the shape of the lesion as it is, compared to the initial ROI image 210.

The radius-dependant contrast adjustment (RDCA) step according to the present invention will be described in more detail later.

In the morphological filtering step (S130), the RDCA image 220 whose contrast is adjusted is filtered using a morphological technique. Referring to FIG. 2B, it can be seen that the effect of noise is removed from the RDCA image 220 by the morphological filtering and a more simplified image 230, in which the shape of the lesion is maintained, is obtained.

Next, in the Gaussian low-pass filtering step (S140), the morphologically filtered image 230 is processed using a low-pass filtering technique with the shape of a Gaussian function, thereby obtaining a softer image 240. Referring to FIG. 2B, it can be seen that the image 240 obtained by Gaussian low-pass filtering has less noise while maintaining the shape of the image, compared to the previous image 230.

The above-described filtering technique is merely an example, and any known technique for removing noise may be selectively used in the present invention.

Here, it is necessary to segment the lesion from the filtered image 240, and thus it is necessary to calculate a threshold value for determining the brightness of the image (S150). In the step of calculating the threshold value, a threshold value is calculated for the initial ROI image 210 obtained in the step (S110) of obtaining the initial image. Referring to FIG. 2B, an image 250 obtained in this step by Otsu's thresholding method is shown.

The Otsu's thresholding method is to find a threshold value used to clearly distinguish between a light part and a dark part of an image and was suggested by Otsu. According to the Otsu's thresholding method, all possible variance values are repeatedly calculated over the entire range of gray levels to find an optimal threshold value. That is, when two regions divided by a threshold value are expressed by an average value of the corresponding region, respectively, the Otsu's thresholding method is to find a threshold value that minimizes the error before and after the division. The Otsu's thresholding method is well known in the art, and thus a detailed description thereof will be omitted.

The calculation of the threshold value may be performed anytime after the step (S110) of obtaining the initial image or before the step (S160) of segmenting the lesion using the threshold value and the threshold value calculation method is not limited to the Otsu's thresholding method.

In the step (S160) of segmenting the lesion, the calculated threshold value is applied to the Gaussian low-pass filtered image 240 to segment the lesion. Referring to FIG. 2B, an image 260 obtained by segmenting the lesion with the threshold value is shown. It can be seen that the boundary of the lesion in the image 260 becomes clearer whiling maintaining the shape of the lesion at it is, compared to the initial image 210.

Then, small regions other than the lesion are eliminated from an image (S170), and a boundary of the lesion is finally obtained (S180). Referring to FIG. 2B, it can be seen that an image 280 of the lesion with the finally obtained boundary is shown.

Next, the radius-dependant contrast adjustment (RDCA) step according to the present invention will be described in more detail with reference to examples.

Radius-Dependant Contrast Adjustment (RDCA) Step

The radius-dependant contrast adjustment (RDCA) step according to the present invention is to adjust an image such that the contrast is increased as it goes away from the center of the image and may comprise the following steps.

Figure 4:
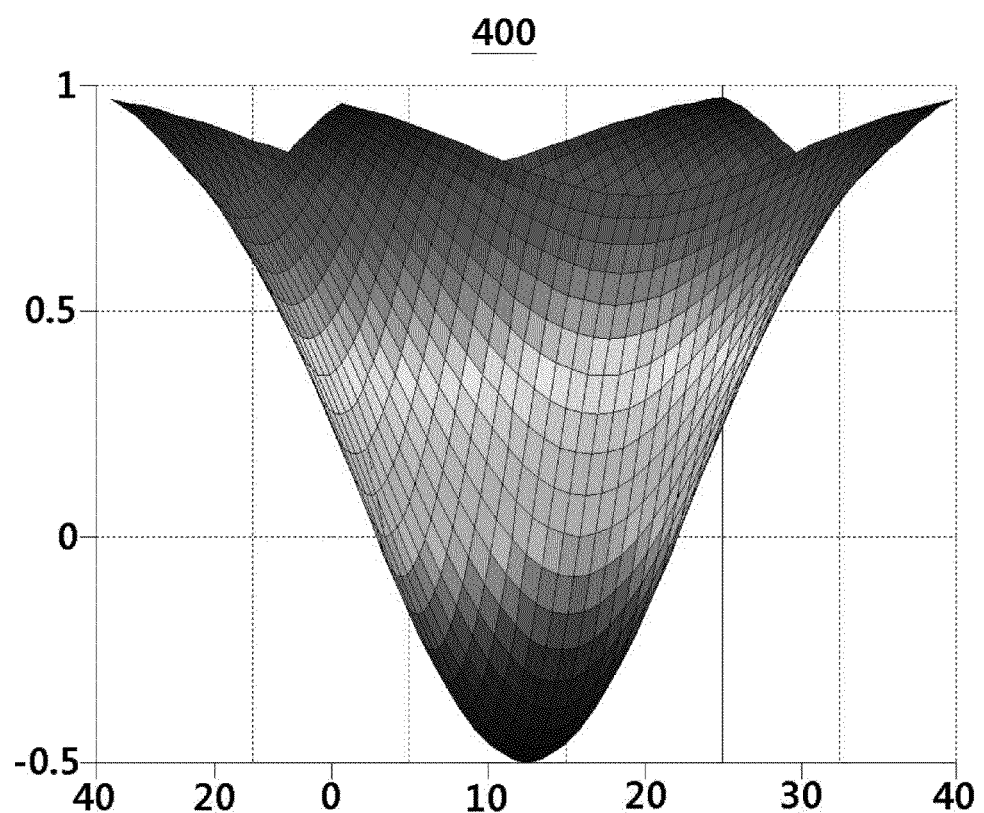
FIG. 4 is a conceptual diagram showing the adjustment of the contrast according to the distance from the center using a Gaussian function in accordance with an exemplary embodiment of the present invention.

FIG. 3 is a sequence chart showing steps of a radius-dependant contrast adjustment (RDCA) step in detail in accordance with an exemplary embodiment of the present invention, and FIG. 4 is a conceptual diagram showing the adjustment of the contrast according to the distance from the center using a Gaussian function in accordance with an exemplary embodiment of the present invention.

Referring to FIG. 3, the radius-dependant contrast adjustment step in accordance with an exemplary embodiment of the present invention may comprise the steps of obtaining the center of a region of interest (ROI) (S310), calculating an average brightness of pixels in the ROI (S320), selecting a pixel whose brightness is to be corrected in the ROI (S330), obtaining coordinates of the selected pixel (S340), applying a two-dimensional Gaussian function to coordinates of each pixel and adjusting the pixel (S350 and S360), obtaining the current brightness of the pixel (S370), calculating a target pixel brightness (S380), and adjusting the brightness of the pixel (S390).

First, in order to perform the radius-dependant contrast adjustment step, the center of an image, which will be a criterion for radius calculation, is obtained (S310). That is, the position of the center (x0, y0) of the initial ROI image 210 of FIG. 2B is obtained.

Subsequently, an average brightness of the initial ROI image 210 is calculated (S320). The average brightness of the image is used to adjust the brightness of each pixel later, and the brightness of all pixels in the initial ROI image 210 is obtained to calculate an average brightness $I_{avg}$ of the pixels.

Then, the brightness of all pixels of the image is adjusted (from S330 to S390) such that the contrast is increased as it goes away from the center (x0, y0) of the image. First, a pixel whose brightness is to be adjusted is selected from the initial ROI image 210 (S330), and coordinates (x, y) of the selected pixel is obtained (S340).

In the next place, a two-dimensional Gaussian function is applied to the obtained coordinates (x, y) of the pixel. As a concrete example, a result value $\hat{w}$ is obtained by applying the following formula 1 to the obtained coordinates (x, y) of the pixel (S350).

$$\hat{w} = \exp\left(\frac{-x(x-x_0)^2}{2\sigma_x^2} + \frac{-(y-y_0)^2}{2\sigma_y^2}\right), 0 < \hat{w} \leq 1$$ [Formula 1]

$$\sigma_x = \frac{1}{4} \times \text{width}$$

$$\sigma_y = \frac{1}{4} \times \text{height}$$

In formula 1, width represents the width of the region of interest, and height represents the height of the region of interest. The method of obtaining the standard deviation is not limited to the exemplary embodiment of the present invention.

The calculated value $\hat{w}$ has an upwardly convex shape. A formula for calculating a value w (S360) by defining the range of the value $\hat{w}$ such that the shape of the calculated value $\hat{w}$ is inverted from the shape of the original two-dimensional Gaussian function to have a greater value as it goes from the center.

The following formula 2 is an example of calculating the value w by defining the range of the value $\hat{w}$.

$$w = 1 - 1.5 \cdot \hat{w}$$ [Formula 2]

If the above formula is applied to the value $\hat{w}$, the value w has a range of $-0.5 \leq w < 1$. Referring to FIG. 4, it can be seen that the shape of the value w calculated by applying the above formula has a downwardly convex shape 400 inverted from the shape of the two-dimensional Gaussian function.

Here, the method of defining the range of the Gaussian distribution function is not limited to the above formula.

Next, the current brightness I of the pixel is obtained (S370), and then a target pixel brightness I' is obtained using the following formula 3 (S380).

$$I' = I + (I-m) \times w$$ [Formula 3]

In the above formula, m is 128 or a value selected from the range of $0 < m \leq I_{avg}$ using the calculated average brightness $I_{avg}$ of the pixels.

Then, the brightness of the image is adjusted by applying the target pixel brightness I' to the pixel of the actual image (S390).

When the above-described steps (S330 to S390) are performed on all pixels of the initial image, an image whose contrast is increased as it goes away from the center of the image, i.e., the RDCA image 220 of FIG. 2B, is obtained.

As described above, according to the method of segmenting a lesion in an image of the present invention, it is possible to segment the lesion while maintaining the original shape of the lesion by adjusting the contrast of the image such that the contrast is increased as it goes away from the center of an ultrasonic image of a region of interest, thereby reliably detecting the boundary of the lesion even in the case where the inside of the lesion is not uniform.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A method of segmenting a lesion implemented by an apparatus of segmenting a lesion, the method comprising:
   obtaining an image of a region of interest from an image of a lesion; adjusting the contrast of the obtained image of the region of interest such that the contrast is increased or reduced according to the distance from the center of the region of interest;
   removing noise from the, image whose contrast is adjusted; and
   separating the region of the lesion from the noise-removed image;
   wherein in the adjusting the contrast, the image is adjusted such that the contrast is increased as it goes away from the center of the region of interest.

2. The method of claim 1, wherein the image is an image of a breast and one of an ultrasonic image, a digital image taken by digital mammography, an analog image taken by analog mammography and digitally converted, and an MRI image.

3. The method of claim 1, wherein the removing the noise comprises performing morphological filtering on the image whose contrast is adjusted.

4. The method of claim 3, wherein the removing the noise comprises performing Gaussian low-pass filtering on the morphologically filtered image.

5. The method of claim 1, wherein the separating the region comprises:

dividing the region of the lesion from the noise-removed image; and obtaining a boundary of the lesion from the image from which the region of the lesion is divided.

6. The method of claim 5, wherein the dividing the region comprises:

calculating a threshold value for the obtained image of the region of interest; and applying the calculated threshold value to the noise-removed image, thereby dividing the region of the lesion.

7. The method of claim 6, wherein the dividing the region further comprises eliminating small regions other than the region of the lesion from the image from which the region of the lesion is divided.

8. A method of segmenting a lesion implemented by an apparatus of segmenting a lesion, the method comprising:

obtaining an image of a region of interest from an image of a lesion;

adjusting the contrast of the obtained image of the region of interest such that the contrast changes according to the distance from the center of the region of interest;

removing noise from the image whose contrast is adjusted; and separating the region of the lesion from the noise-removed image, wherein in the adjusting the contrast, the image is adjusted such that the contrast is increased as it goes away from the center of the region of interest, and wherein the adjusting the contrast comprises, obtaining the center (x0, y0) of the region of interest, calculating an average brightness $I_{avg}$ of the current brightness I of pixels in the region of interest, and adjusting the brightness of each pixel such that the contrast is increased as it goes away from the center of the region of interest, wherein the adjusting the brightness comprises, obtaining coordinates (x, y) of a pixel, calculating a result value $\hat{w}$ by applying a two-dimensional Gaussian distribution function to the obtained coordinates (x, y) of the pixel, calculating a value w by defining the range of the value $\hat{w}$ such that the shape of the calculated value $\hat{w}$ is inverted from the shape of the original two-dimensional Gaussian distribution function, obtaining the current brightness/of the pixel, calculating a target pixel brightness I' using the obtained current brightness I and the calculated value w to adjust the contrast, and adjusting the brightness of the pixel to the target pixel brightness I'.

9. The method of claim 4, wherein in the calculating the value w, the value $\hat{w}$ is substituted into $w=1-1.5\cdot\hat{w}$ such that the calculated value w has a range of $-0.5 \leq w < 1$.

10. The method of claim 8, wherein in the calculating the target pixel brightness I', the obtained current brightness I and the calculated value w are substituted into $I'=I+(I-m)\cdot w$ to calculate the target pixel brightness I' and, wherein m is a value selected from the range of $0 < m \leq I_{avg}$.

* * * * *